United States Patent
Stephenson

[11] 3,888,541
[45] June 10, 1975

[54] BELT LOCKING ASSEMBLY FOR SAFETY BELT BUCKLE

[75] Inventor: Robert L. Stephenson, Sterling Heights, Mich.

[73] Assignee: Allied Chemical Corporation, New York, N.Y.

[22] Filed: July 1, 1974

[21] Appl. No.: 484,823

[52] U.S. Cl............. 297/388; 24/78; 280/150 S B; 297/389
[51] Int. Cl............................................ A62b 35/00
[58] Field of Search .......... 297/388, 389, 385, 386; 280/150 S B; 24/78, 77, 75

[56] References Cited
UNITED STATES PATENTS

| | | | |
|---|---|---|---|
| 3,013,317 | 12/1961 | Weber | 24/78 X |
| 3,100,669 | 8/1963 | Monroe | 297/388 |
| 3,231,307 | 1/1966 | Smith | 297/388 |
| 3,233,296 | 2/1966 | Whittingham | 24/78 |
| 3,348,881 | 10/1967 | Weman | 297/389 |
| 3,409,949 | 11/1968 | Kobrehel et al. | 24/77 R |

FOREIGN PATENTS OR APPLICATIONS

| | | | |
|---|---|---|---|
| 745,012 | 10/1966 | Canada | 297/389 |

Primary Examiner—James T. McCall
Attorney, Agent, or Firm—John P. Kirby, Jr.

[57] ABSTRACT

The belt locking assembly is slidably mounted on a continuous length of safety belt, which forms a shoulder belt and a lap belt. The shoulder belt has a shoulder belt anchorage point and the lap belt has a lap belt anchorage point. The belt locking assembly includes a housing for the assembly, a buckle engaging means, a roller means, a lock bar and a biasing means. A portion of the safety belt moves upon the roller means to facilitate movement of the belt locking assembly with reference to the safety belt and adjustment of the length of the shoulder belt and lap belt. The lock bar is adapted to be moved from an unlocked position to a locked position when the assembly is engaged in a buckle. The lock bar in the locked position prevents the assembly from sliding with reference to the safety belt in the direction of the shoulder belt anchorage point, but allows the assembly to slide with reference to the safety belt in the direction of the lap belt anchorage point.

18 Claims, 6 Drawing Figures

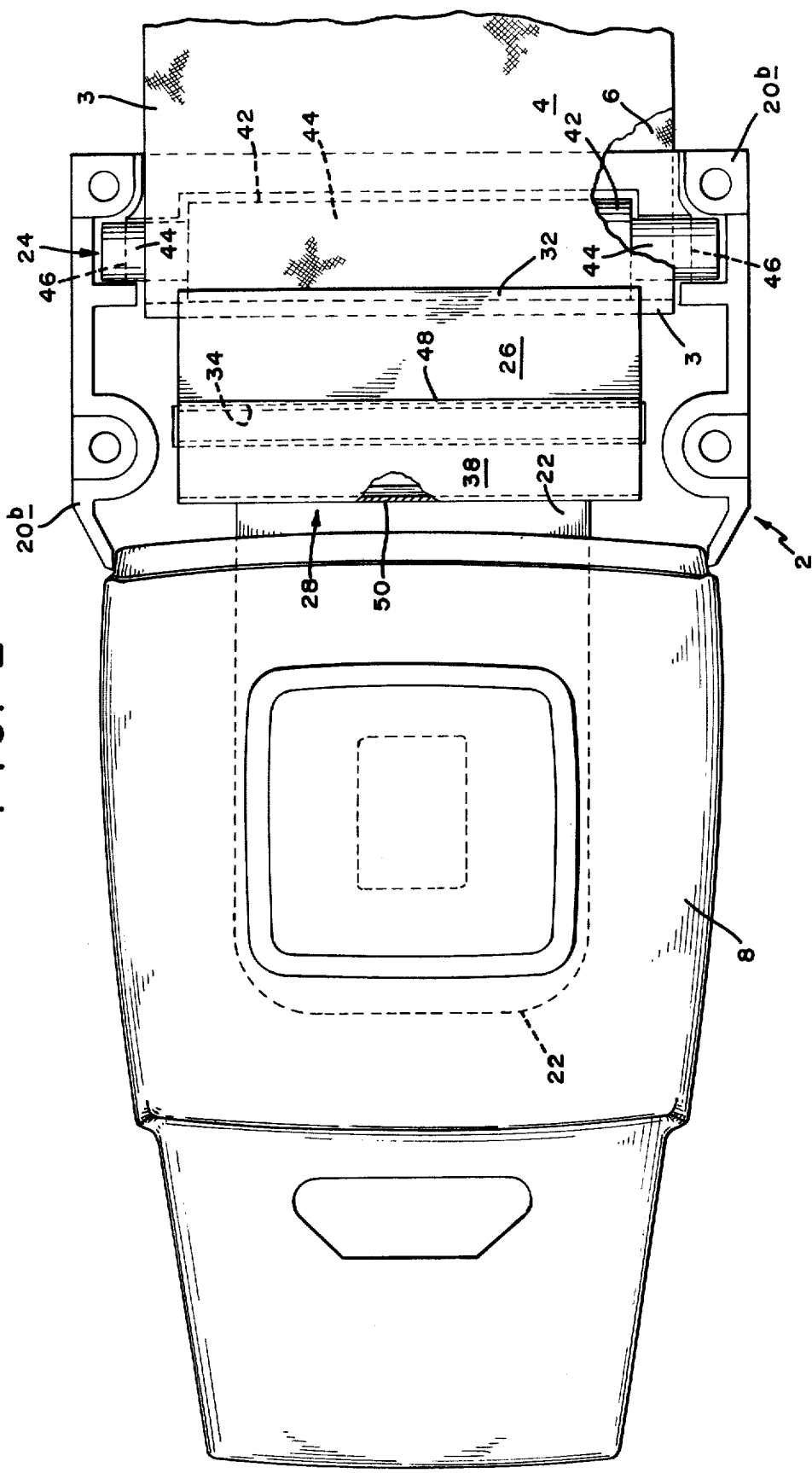

BELT LOCKING ASSEMBLY FOR SAFETY BELT BUCKLE

BACKGROUND OF THE INVENTION

This invention relates to a safety belt system adapted for use in vehicles, such as automobiles. More particularly, this invention relates to a safety belt system using an adjustable belt locking assembly having a tongue means for engagement in a buckle. The belt locking assembly is adapted to be used on a continuous length of safety belt which includes a lap belt and a shoulder belt in a three point safety belt.

Typically, prior art safety belts include a buckle assembly having a tongue which is adapted to be inserted into a buckle housing. The tongue is usually attached to a lap belt or a shoulder belt or both. The lap belt and the shoulder belt may comprise a continuous length of belt to which the tongue is slidably attached. Typically, the end of the lap belt remote from the tongue is secured to a lap belt anchorage point in the vehicle. The end of the shoulder belt remote from the tongue is secured to a shoulder belt anchorage point in the vehicle. The buckle housing, which is adapted to receive the tongue, is also secured to a buckle anchorage point in the vehicle. Because of the three anchorage points, such a safety belt is sometimes referred to as a three point safety belt. An example of such a three point safety belt is disclosed in U.S. Pat. No. 3,348,881 to Per Olof Weman, entitled "Fastening Means for a Three-Point Safety Belt, Particularly for Motor Vehicles."

In safety belts having a continuous length of belt webbing, the safety belt is typically looped through a tongue assembly. The tongue assembly is usually movable on the safety belt in order to allow adjustment of the length of belt available for fastening across the lap of the passenger and the amount of belt webbing available for fastening across the shoulder and chest of the passenger. Some prior art three point safety belts use two safety belt retractors, one such retractor at the lap belt anchorage point and the second retractor at the shoulder belt anchorage point. It is desirable to reduce the number of such retractors needed from two retractors to one retractor. It is desirable to have a single inertia retractor on the shoulder belt and have a belt locking assembly which has a locked position in which the belt locking assembly is prevented from sliding on the safety belt to enlarge the length of the lap belt.

SUMMARY OF THE INVENTION

The safety belt system of this invention is adapted for use in a vehicle. The safety belt system includes a continuous length of safety belt, a safety belt inertia retractor, a non-adjustable lap belt anchorage means, a belt locking assembly and a buckle. The continuous length of safety belt forms a shoulder belt and a lap belt. The shoulder belt has a shoulder belt anchorage point and the lap belt has a lap belt anchorage point. The safety belt inertia retractor is located at the shoulder belt anchorage point and the shoulder belt is connected to the belt retractor. The lap belt anchorage means is located at the lap belt anchorage point.

The belt locking assembly of this invention is intended for use with a vehicle safety belt and is adapted to be engaged by the buckle. The belt locking assembly is mounted on the safety belt and is adapted to slide upon a portion of the safety belt to adjust the length of the lap belt and the shoulder belt. The belt locking assembly includes a housing for the assembly, a buckle engaging means, a roller means, a lock bar, and a biasing means.

The buckle engaging means extends from the housing and is adapted to be engaged in the buckle. The roller means is supported by the housing and is adapted to allow a portion of the safety belt to move upon the roller means to facilitate movement of the assembly with reference to the safety belt. The lock bar is mounted in the housing and has an unlocked position and a locked position. The lock bar is adapted to be moved from the unlocked position to the locked position when the assembly is engaged in the buckle. The lock bar in the unlocked position allows the assembly to slide with reference to the safety belt both in the direction of the shoulder belt anchorage point and in the direction of the lap belt anchorage point. The lock bar in the locked position prevents the assembly from sliding with reference to the safety belt in the direction of the shoulder belt anchorage point, but allows the assembly to slide with reference to the safety belt in the direction of the lap belt anchorage point. The biasing means is mounted in the housing and biases the lock bar in the unlocked position.

The lock bar has a buckle actuated portion and a belt engaging portion. The buckle actuated portion is adapted to be actuated by the buckle when the assembly is engaged by the buckle. The belt engaging portion is adapted to clamp against a portion of the safety belt when the assembly is engaged by the buckle to prevent the roller means from moving with reference to the safety belt in the direction of the shoulder belt anchorage point when the lock bar is in the locked position. The buckle actuated portion is disposed at one end of said lock bar and the belt engaging portion is disposed at the opposite end of said lock bar. The lock bar has a pivot edge upon which the lock bar is adapted to pivot between the unlocked position and the locked position. The belt engaging portion of the lock bar has teeth disposed adjacent to the roller means and adapted to clamp against a portion of the safety belt when the lock bar is in the locked position.

The biasing means includes at least one leaf spring attached to the lock bar. Preferably, the biasing means includes a top leaf spring attached to the top of the buckle actuated portion of the lock bar. The lock bar preferably includes a bottom leaf spring attached to the bottom of the buckle actuated portion of the lock bar. The bottom leaf spring is adapted to be actuated by the buckle to move the lock bar into the locked position. The roller means includes a roller and a roller shaft. The roller is adapted to allow a portion of the safety belt to move upon the roller. The roller shaft is mounted in the housing. The roller is arranged concentrically around the roller shaft and is adapted to rotate upon the roller shaft to facilitate movement of the assembly with reference to the safety belt.

DESCRIPTION OF THE DRAWINGS

FIG. 2 is a top plan view of the belt locking assembly of FIG. 1 engaged in a buckle.

DETAILED DESCRIPTION

Figure 1:
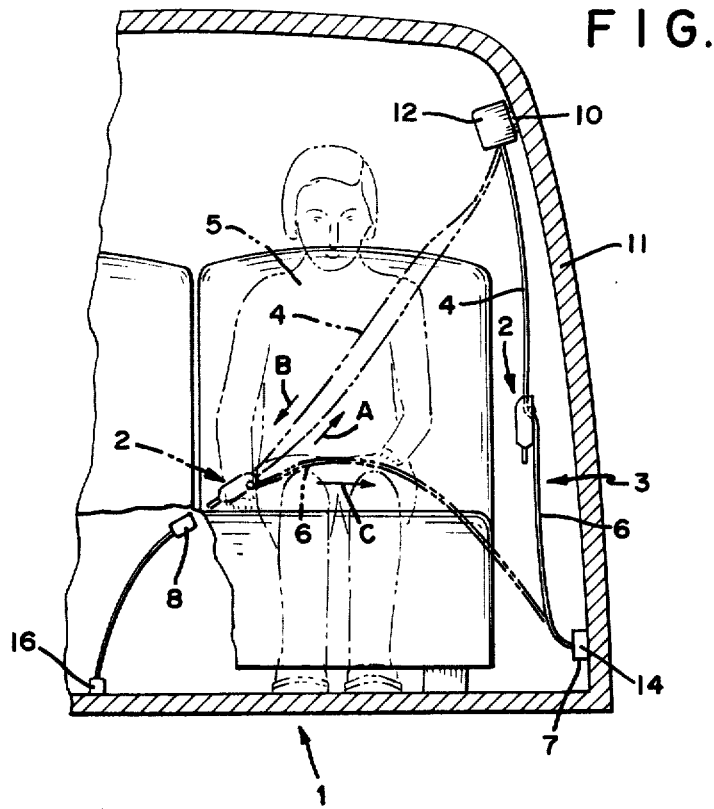
FIG. 1 is an illustration of the safety belt system and belt locking assembly of this invention in use in a vehicle.

Referring to FIG. 1, the safety belt system of this invention, referred to generally by the numeral 1, is adapted to be used in a vehicle 11, such as an automobile. The safety belt system 1 includes a continuous length of safety belt, referred to generally by the numeral 3, a safety belt inertia retractor 12, a nonadjustable lap belt anchorage means 7, a belt locking assembly, referred to generally by the numeral 2, and a buckle 8. The belt locking assembly 2 of this invention is adapted to be slidably mounted on the continuous length of safety belt 3, which forms a shoulder belt 4 and a lap belt 6. The belt locking assembly 2 is adapted to be engaged in the buckle 8.

The end of the shoulder belt 4 remote from the belt locking assembly 2 is secured to a safety belt retractor 12 located at a shoulder belt anchorage point 10 in the vehicle 11. The end of the lap belt 6 remote from the belt locking assembly 2 is secured to a lap belt anchorage point 14 in the vehicle 11. The buckle 8 is secured to a buckle anchorage point 16 in the vehicle 11. Because of the three anchorage points 10, 14, and 16, such a safety belt system is sometimes referred to as a "three point safety belt system".

Only one inertia retractor 12 is required to be used with the safety belt system and the belt locking assembly 2 of this invention. No retractor is required at the lap belt anchorage point 14 or at the buckle anchorage point 16. A non-adjustable lap belt anchorage means (not shown) is located at the lap belt anchorage point. A non-adjustable buckle anchorage means (not shown) is located at the buckle anchorage point. The inertia retractor 12 may be vehicle-sensitive, or belt-sensitive, or both vehicle-sensitive and belt-sensitive. Preferably, for purposes of simplicity, the retractor 12 is vehicle-sensitive.

A vehicle-sensitive retractor is a retractor which locks in response to sudden movements of the vehicle, such as sudden acceleration, deceleration or overturning. An example of a vehicle-sensitive retractor is disclosed in U.S. Pat. application Ser. No. 312,534 entitled "Vehicle Sensitive Retractor" filed in the name of L. E. Bell on Dec. 6, 1972, now U.S. Pat. No. 3,838,831. A belt-sensitive retractor is a retractor which locks in response to sudden unwinding of the safety belt, such as when the user lurches forward and thereby jerks the safety belt. An example of a belt-sensitive retractor is disclosed in U.S. Pat. No. 3,741,496 entitled "Safety Seat Belt Retractor" filed in the name of H. R. Beller on July 13, 1971 and issued on June 26, 1973. A retractor which is both vehicle-sensitive and belt-sensitive will lock either in response to sudden movements of the vehicle or sudden unwinding of the safety belt. Examples of retractors which are both vehicle-sensitive and webbing-sensitive are disclosed in U.S. Pat. applications: Ser. No. 345,380 entitled "Dual Action Safety Seat Belt Retractor" filed in the name of R. L. Stephenson on Mar. 27, 1973, now U.S. Pat. No. 3,858,824; Ser. No. 370,567 entitled "Seat Belt Retractor Having Inertial Device Activated by Two Stimuli" filed in the name of H. Beller on June 15, 1973; Ser. No. 402,448 entitled "Emergency Locking Retractor" filed in the name of P. O. Weman on Oct. 1, 1973; and U.S. Pat. No. 3,122,339 to J. C. Whittingham, entitled "Inertia Reel Mechanism" filed Jan. 25, 1963 and issued Feb. 25, 1964.

Referring to FIG. 1, the dashed lines depict the belt locking assembly 2 and safety belt 3 as they are about to be placed in operation by engaging the belt locking assembly 2 in the buckle 8. The solid lines for the belt locking assembly 2 and safety belt 3 indicate their position in a vehicle 11 when not in use. When the belt locking assembly 2 is not in use, it may be secured to the frame of the vehicle by means not shown, such as a hook. The retractor 12 operates to take up the slack in the safety belt 3 by means of a clamping action described in detail subsequently.

After engagement of the belt locking assembly 2 in the buckle 8 and resulting clamping action, the shoulder belt 4 may be pulled in the direction indicated by arrow A through the belt locking assembly 2 which has the result of tightening the lap belt 6 because of the movement of the belt locking assembly 2 with reference to the safety belt 3 in the direction of the lap belt anchorage point 14. After engagement of the belt locking assembly 2 in the buckle 8, the shoulder belt 4 may be loosened about the occupant 5 by pulling in the direction indicated by arrow B, which unwinds the shoulder belt 4 out of the retractor 12 to allow the passenger for example, to lean forward, while the lap belt 6 remains tightened because there is no movement of the belt locking assembly. After engagement of the belt locking assembly 2 in the buckle 8, the lap belt 6 may not be loosened because of the clamping action in the belt locking assembly 2 which prevents the belt locking assembly 2 from sliding with reference to the safety belt 3 in the direction of the shoulder belt anchorage point 10 (arrow A). Thus, after engagement, the belt locking assembly 2 is capable of being moved in the direction of arrow C with reference to the lap belt 6, but is not capable of being moved in the direction of arrow A with reference to the shoulder belt 4. If the retractor 12 fails to lock, the belt locking assembly 2 of this invention is nevertheless locked after engagement. As a result, the lap belt 6 will restrain the occupant 5, even though the shoulder belt 4 may not restrain the occupant 5 because of malfunction in the retractor 12.

Figure 4:
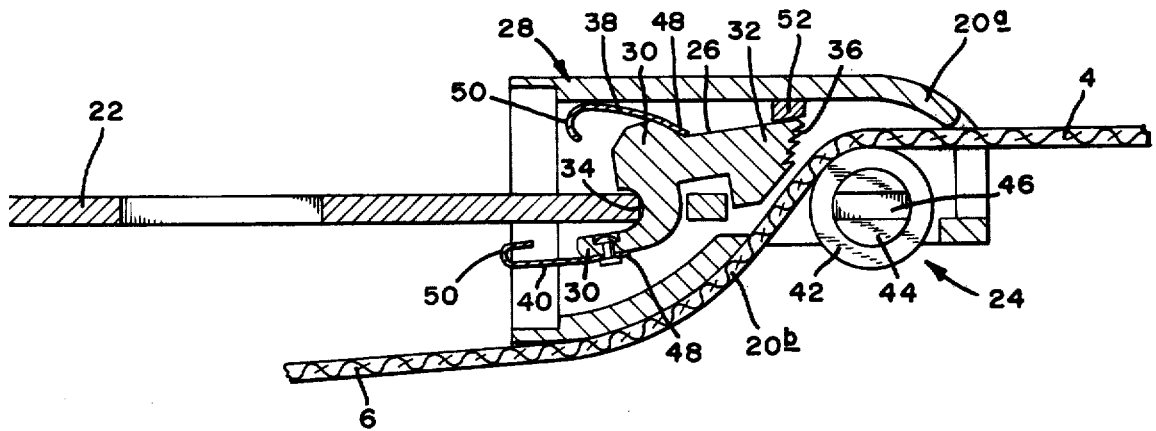
FIG. 4 is a side view of FIG. 2 showing the belt locking assembly in unlocked position.
Figure 5:
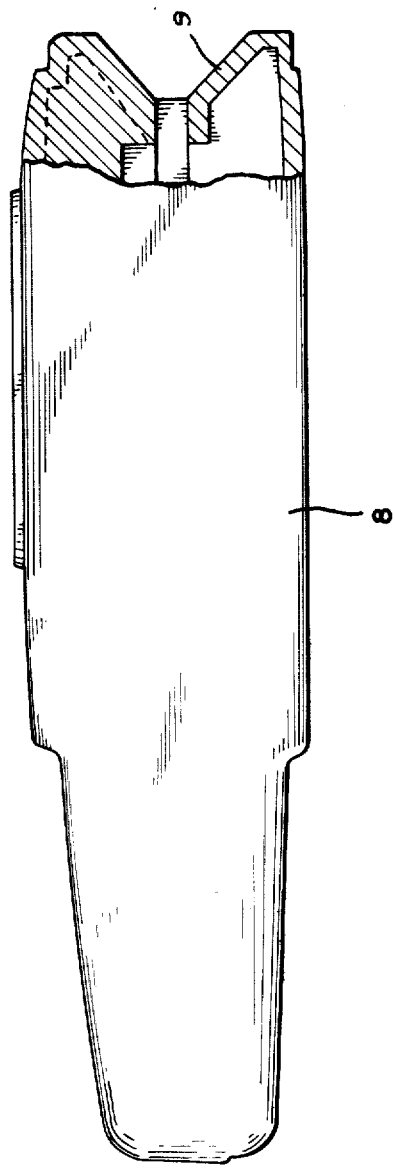
FIG. 5 is a side view of FIG. 2 showing the buckle prior to engaging the belt locking assembly.

Referring to FIGS. 2 – 5, the belt locking assembly 2 (FIG. 4) is adapted to be engaged by a buckle 8 (FIG. 5). Referring to FIGS. 2 – 5, the belt locking assembly 2 includes a housing 20a and 20b, a buckle engaging means 22; a roller means, referred to generally by the numeral 24; a lock bar 26; and a biasing means referred to generally by the numeral 28. The buckle engaging means 22 may be a tongue which extends from the housing 20a and 20b and is adapted to be engaged in the buckle 8. The roller means 24 is supported by the housing 20a and 20b and is adapted to allow a portion of the safety belt 3 adjacent to the belt locking assembly 2 to move upon the roller means 24. The lock bar 26 has an unlocked position, illustrated in FIG. 4 and a locked position, illustrated in FIG. 3. The lock bar 26 is adapted to be moved from the unlocked position of FIG. 4 to the locked position of FIG. 3 when the belt locking assembly 2 is engaged in the buckle 8 illustrated in FIG. 5. The lock bar 26 in the unlocked position allows the belt locking assembly 2 to slide with reference to the safety belt 3 both in the direction of the shoulder belt anchorage point 10, indicated by arrow A, and in the direction of the lap belt anchorage point 14, indicated by arrow C.

Figure 3:
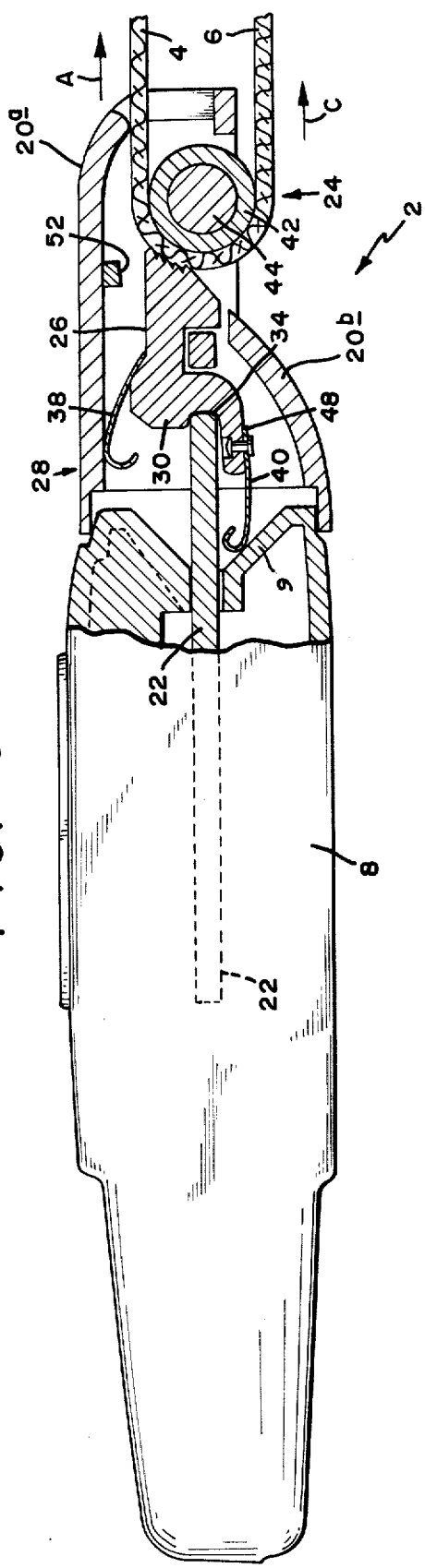
FIG. 3 is a side view of FIG. 2.

The lock bar 26 has a buckle actuated portion 30 and a belt engaging portion 32. The buckle actuated portion 30 is adapted to be actuated by a forward edge 9 of the buckle 8 which presses against a bottom leaf spring 40 when the belt locking assembly 2 is engaged by the buckle 8. Referring to FIG. 3, the belt engaging portion 32 is adapted to engage a portion of the safety belt 3 by clamping upon a portion of the safety belt 3 when the buckle engaging means 32 is engaged in the buckle 8 to prevent the safety belt 3 from moving with reference to the roller means 24 in the direction of the lap belt anchorage point 14 indicated by arrow C in FIGS. 1 and 3, which would allow loosening of the lap belt 6. Stated another way, the belt engaging portion 32 is adapted to engage a portion of the safety belt 3 when the buckle engaging means 22 is engaged in the buckle 8 to prevent the roller means 24 and the other parts of the belt locking assembly 2 from moving toward the shoulder belt anchorage point 10, in the direction of arrow A in FIGS. 1 and 3, with reference to the safety belt 3, which would allow loosening of the lap belt 6. The clamping action takes place on the portion of the safety belt 3 which is between the belt engaging portion 32 of the lock bar 26 and the roller means 24 when the buckle engaging means 22 is engaged in the buckle 8.

However, even when the belt engaging portion 32 engages the safety belt 3, the safety belt 3 may be moved in the direction of arrow A in FIGS. 1 and 3, which has the effect of tightening the lap belt 6. Stated another way, even when the belt engaging portion 32 engages the safety belt 3, the belt locking assembly 2 may be moved in the direction of the lap belt anchorage point 14, in the direction of arrow C in FIGS. 1 and 3 with reference to the safety belt 3, which has the effect of tightening the lap belt 6. Thus, the belt locking assembly 2 may be adjusted in both directions prior to engagement in the buckle 8. Prior to engagement in the buckle 8, the belt locking assembly 2 may slide with reference to the safety belt 3 both in the direction of the shoulder belt anchorage point 10 indicated by arrow A in FIG. 1, and in the direction of lap belt anchorage point 14, indicated by arrow C in FIG. 1. After engagement in the buckle 8, the belt locking assembly 2 is adjustable in only one direction, the direction which would allow tightening of the safety belt.

The buckle actuated portion 30 is disposed at one end of the lock bar 26 adjacent to the buckle 8 and the belt engaging portion 32 is disposed at the opposite end of the lock bar 26 adjacent to the roller means 24. The lock bar 26 has a pivot edge 34 upon which the lock bar 26 is adapted to pivot between the unlocked position shown in FIG. 4 and the locked position shown in FIG. 3. The belt engaging portion 32 of the lock bar 26 is disposed adjacent to the roller means 24. The feature which allows the safety belt 3 to be moved with reference to the belt locking assembly 2 in the direction of the shoulder belt anchorage point 10, indicated by arrow A, but not in the direction of the lap belt anchorage point, indicated by arrow C, after engagement, is the result of the geometrical arrangement of the lock bar 26, including the arrangement of pivot edge 34, with reference to the roller means 24. Referring to FIG. 3, the pivot edge 34 is on approximately the same horizontal plane as the center of rotation of the roller means 24. The area of contact of the belt engaging portion 32 of the lock bar 26 with the safety belt 3 is above this horizontal plane. As a result of this geometrical arrangement, when the shoulder belt 4 is pulled in the direction of the shoulder belt anchorage poing 10 indicated by arrow A, it pulls the belt engaging portion 32 of the lock bar 26 away from the roller means 24, thereby reducing clamping action and allowing tightening of the lap belt 6. When the lap belt 6 is pulled in the direction of the lap belt anchorage point 14, indicated by arrow C, it does not pull the belt engaging portion 32 of the lock bar 26 away from the roller means 24 and does not reduce clamping action nor allow loosening of the lap belt 6.

To facilitate the clamping action, the belt engaging portion 32 of the lock bar 26 has locking teeth 36 disposed adjacent to the roller means 24. The locking teeth 36 are adapted to clamp against a portion of the safety belt 3 which is between the belt engaging portion 32 of the lock bar 26 and roller means 24 when the lock bar 26 is in the locked position, as shown in FIG. 3, to prevent the belt locking assembly 2 from sliding with reference to the safety belt 3 in the direction of the shoulder belt anchorage point 10. Alternately, a knurled surface may be used in the belt engaging portion 32 of the lock bar 26.

Referring to FIGS. 2, 3, 4 and 6, the biasing means 28 is a top leaf spring 38 attached to the lock bar. The lock bar 26 includes a bottom leaf spring 40 which the buckle 8 presses against during engagement of the belt locking assembly 2 in the buckle 8. The force of the buckle 8 against the bottom leaf spring 40 overcomes the spring tension of the top leaf spring 38 to move the lock bar 26 into locked position. The top leaf spring 38 is attached to the top of the buckle actuated portion 30 of the lock bar 26. The bottom leaf spring 40 is attached to the bottom of the buckle actuated portion 30 of the lock bar 26.

Figure 6:
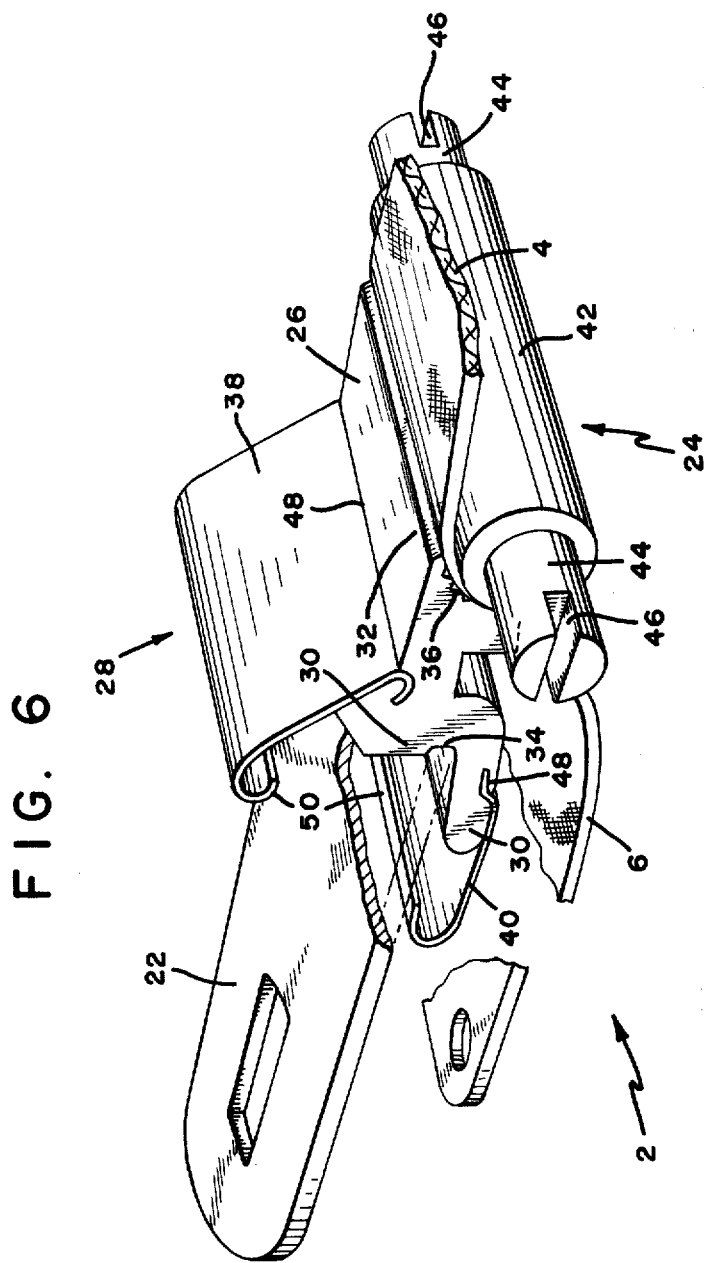
FIG. 6 is an isometric view of a portion of the belt locking assembly showing interior components.

Referring to FIG. 6, the roller means 24 includes a roller 42 and a roller shaft 44. The roller 42 is adapted to allow a portion of the safety belt 3 to move upon the roller 42. The roller shaft 44 is mounted in the housing 20a and 20b (FIGS. 2 – 4). The roller 42 is arranged concentrically around a portion of the roller shaft 44 and is adapted to rotate upon the roller shaft 44 to facilitate movement of the belt locking assembly 2 with reference to the safety belt 3. The roller shaft 44 is affixed to the housing 20a and 20b, preferably by means of a key slot 46 in each end of the roller shaft 44. The roller 42 turns freely upon the roller shaft 44.

Referring to FIG. 6, the lock bar 26 is an irregularly shaped member having a width which extends across the width of the housing 20a and 20b and the safety belt 3. The belt engaging portion 32 of the lock bar 26 and the locking teeth 36 of the lock bar 26 makes contact with the safety belt 3 across substantially the entire width of the safety belt 3. The leaf springs 38 and 40 have a width which is substantially equal to the width of the lock bar 26 and the width of the safety belt 3. The leaf springs 38 and 40 each have a flat planar surface, a lock bar end 48 and a free end 50. Referring to FIG. 4, in a primary embodiment the free ends 50 may have a curled edge and the lock bar ends 48 may be substantially straight. In the primary embodiment, the lock bar ends 48 are attached to the lock bar 26 by rivets or screws. Referring to FIG. 6, in a secondary embodiment, both the free ends 59 and the lock bar end 48 have a curled edge. The lock bar end 48 of each leaf spring 38 and 40 is adapted to be affixed, and preferably, embedded in the buckle actuated portion 30 of the lock bar 26. Referring to FIGS. 3 and 4, the belt locking assembly further includes a stop member 52 mounted on the interior surface of the housing 20a above the belt engaging portion 32 of the lock bar 26. The stop member 52 limits the pivoting movement of the lock bar 26 toward the unlocked position shown in FIG. 4.

An important advantage of the belt locking assembly 2 is that when the lock bar 26 is in the unlocked position there is no abrasion by the lock bar 26 on the safety belt 3. In the unlocked position, the roller means 24 is free-wheeling, that is, turns freely in either direction. Another advantage is that the belt locking assembly 2 is self-adjusting. The safety belt system 1 of this invention, having the belt locking assembly 2, automatically adjusts the shoulder belt 4 and lap belt 6 to proper length and tension. The automatic, self-adjusting feature is the result of the action of the shoulder belt retractor 12 and the free-wheeling roller means 24. In the unlocked position the roller means 24 is free-wheeling. In the locked position, the roller means 24 will turn in the direction to allow tightening of the lap belt 6. The retracting pull of the retractor 12 is felt by the lap belt 6, as well as by the shoulder belt 4. The belt locking assembly 2 can also be adjusted manually, for example, to tighten the lap belt 6 further after the belt locking assembly 2 is engaged in the buckle 8.

I claim:

1. A belt locking assembly for a vehicle safety belt adapted to be engaged by a buckle, said vehicle safety belt including a continuous length which forms a shoulder belt and a lap belt, said shoulder belt having a shoulder belt anchorage point and said lap belt having a lap belt anchorage point, said belt locking assembly being adapted to be mounted on the safety belt and adapted to slide upon a portion of the safety belt to adjust the length of the lap belt and shoulder belt, said belt locking assembly comprising:

a housing for said assembly;

a buckle engaging means extending from said housing and adapted to be engaged in said buckle;

a roller means supported by said housing and adapted to allow a portion of said safety belt to move upon said roller means to facilitate movement of said assembly with reference to said safety belt;

a lock bar mounted in said housing and having an unlocked position and a locked position, said lock bar adapted to be moved from said unlocked position to said locked position when said assembly is engaged in said buckle, said lock bar in said unlocked position allowing said assembly to slide with reference to said safety belt both in the direction of said shoulder belt anchorage point and in the direction of said lap belt anchorage point, said lock bar in said locked position preventing said assembly from sliding with reference to said safety belt in the direction of said shoulder belt anchorage point, but allowing said assembly to slide with reference to said safety belt in the direction of said lap belt anchorage point; and biasing means mounted in said housing to bias said lock bar in said unlocked position.

2. The belt locking assembly according to claim 1 wherein said lock bar has:

a buckle actuated portion adapted to be actuated by said buckle when said assembly is engaged by said buckle; and a belt engaging portion adapted to clamp against a portion of said safety belt when said assembly is engaged by said buckle to prevent said roller means from moving with reference to said safety belt in the direction of said shoulder belt anchorage point when said lock bar is in said locked position.

3. The belt locking assembly according to claim 2 wherein said buckle actuated portion is disposed at one end of said lock bar and said belt engaging portion is disposed at the opposite end of said lock bar.

4. The belt locking assembly according to claim 1 wherein said lock bar has a pivot edge upon which said lock bar is adapted to pivot between said unlocked position and said locked position.

5. The belt locking assembly according to claim 2 wherein said belt engaging portion of said lock bar has locking teeth disposed adjacent to said roller means and adapted to clamp against a portion of said safety belt when the lock bar is in the locked position to prevent said belt locking assembly from sliding with reference to said safety belt in the direction of the shoulder belt anchorage point.

6. The belt locking assembly according to claim 1 wherein said biasing means comprises at least one leaf spring attached to said lock bar.

7. The belt locking assembly according to claim 1 wherein:

said biasing means comprises a top leaf spring attached to the top of the buckle actuated portion of said lock bar; and said lock bar further comprises a bottom leaf spring attached to the bottom of said buckle actuated portion of said lock bar, said bottom leaf spring being adapted to be actuated by said buckle to move said lock bar into said locked position.

8. The belt locking assembly according to claim 1 wherein said roller means comprises:

a roller adapted to allow a portion of said safety belt to move upon said roller; and a roller shaft mounted in said housing, said roller being arranged concentrically around a portion of said roller shaft and being adapted to rotate upon said roller shaft to facilitate movement of said assembly with reference to said safety belt.

9. A belt locking assembly for a vehicle safety belt adapted to be engaged by a buckle, said vehicle safety belt including a continuous length which forms a shoulder belt and a lap belt, said shoulder belt having a shoulder belt anchorage point and said lap belt having a lap belt anchorage point, said belt locking assembly comprising:

a housing for said belt locking assembly;

a buckle engaging means extending from said housing and adapted to be engaged in said buckle;

a roller adapted to allow a portion of said safety belt to move upon said roller;

a roller shaft mounted in said housing, said roller being arranged concentrically around a portion of said roller shaft and being adapted to rotate upon said roller shaft to facilitate movement of said assembly with reference to said safety belt;

a lock bar mounted in said housing and having an unlocked position and a locked position, said lock bar adapted to be moved from said unlocked position to said locked position when said assembly is engaged in said buckle, said lock bar in said unlocked position allowing said assembly to slide with reference to said safety belt both in the direction of said shoulder belt anchorage point and in the direction of said lap belt anchorage point, said lock bar in said locked position preventing said assembly from sliding with reference to said safety belt in the direction of said shoulder belt anchorage point, said lock bar having a buckle actuated portion adapted to be actuated by said buckle when said belt locking assembly is engaged by said buckle and a belt engaging portion adapted to clamp against a portion of said safety belt when said assembly is engaged by said buckle to prevent said roller from moving with reference to said safety belt in the direction of said shoulder belt anchorage point when said lock bar is in said locked position, and said buckle actuated portion being disposed at one end of said lock bar and said belt engaging portion being disposed at the opposite end of said lock bar, said lock bar having a pivot edge upon which said lock bar is adapted to pivot from said unlocked position to said locked position, said belt engaging portion of said lock bar having teeth disposed adjacent to said roller and adapted to clamp against a portion of said safety belt to prevent said roller from moving with reference to said safety belt in the direction of said shoulder belt anchorage point when said lock bar is in said locked position; and at least one leaf spring attached to said lock bar to bias said lock bar in said unlocked position.

10. A safety belt system adapted for use in a vehicle comprising:

a continuous length of safety belt which forms a shoulder belt and a lap belt, said shoulder belt having a shoulder belt anchorage point and said lap belt having a lap belt anchorage point;

a safety belt inertia retractor located at said shoulder belt anchorage point to which retractor said shoulder belt is connected;

a non-adjustable lap belt anchorage means located at said lap belt anchorage point;

a belt locking assembly mounted on said safety belt and being adapted to slide upon a portion of said safety belt to adjust the length of said lap belt and said shoulder belt; and a buckle adapted to engage said belt locking assembly; said belt locking assembly comprising:

a housing for said belt locking assembly;

a buckle engaging means extending from said housing and adapted to be engaged in said buckle;

a roller means supported by said housing and adapted to allow a portion of said safety belt to move upon said roller means;

a lock bar disposed in said belt locking assembly, said lock bar having an unlocked position and a locked position, said lock bar adapted to be moved from said unlocked position to said locked position when said assembly is engaged in said buckle, said lock bar in said unlocked position allowing said assembly to slide with reference to said safety belt both in the direction of said shoulder belt anchorage point and in the direction of said lap belt anchorage point, said lock bar in said locked position preventing said assembly from sliding with reference to said safety belt in the direction of said shoulder belt anchorage point, but allowing said assembly to slide with reference to said safety belt in the direction of said lap belt anchorage point; and biasing means disposed in said belt locking assembly to bias said lock bar in said unlocked position.

11. The safety belt system according to claim 10 wherein said lock bar of said belt locking assembly has:

a buckle actuated portion adapted to be actuated by said buckle when said assembly is engaged by said buckle; and a belt engaging portion adapted to clamp against a portion of said safety belt when said assembly is engaged by said buckle to prevent said roller means from moving with reference to said safety belt in the direction of said shoulder belt anchorage point when said lock bar is in said locked position.

12. The safety belt system according to claim 11 wherein said buckle actuated portion is disposed at one end of said lock bar and said belt engaging portion is disposed at the opposite end of said lock bar.

13. The safety belt system according to claim 10 wherein said lock bar of said belt locking assembly has a pivot edge upon which said lock bar is adapted to pivot between said unlocked position and said locked position.

14. The safety belt system according to claim 11 wherein said belt engaging portion of said lock bar has locking teeth disposed adjacent to said roller means and adapted to clamp against a portion of said safety belt when the lock bar is in the locked position.

15. The safety belt system according to claim 10 wherein said biasing means of said belt locking assembly comprises at least one leaf spring attached to said lock bar.

16. The safety belt system according to claim 10 wherein:

said biasing means of said belt locking assembly comprises a top leaf spring attached to the top of the buckle actuated portion of said lock bar; and said lock bar further comprises a bottom leaf spring attached to the bottom of said buckle actuated portion of said lock bar, said bottom leaf spring being adapted to be actuated by said buckle to move said lock bar into said locked position.

17. The safety belt system according to claim 10 wherein said roller means of said belt locking assembly comprises:

a roller adapted to allow a portion of said safety belt to move upon said roller; and a roller shaft mounted in said housing, said roller being arranged concentrically around a portion of said roller shaft and being adapted to roll upon said roller shaft to facilitate movement of said assembly with reference to said safety belt.

18. A safety belt system adapted for use in a vehicle comprising:

a continuous length of safety belt which forms a shoulder belt and a lap belt, said shoulder belt having a shoulder belt anchorage point and said lap belt having a lap belt anchorage point;

a safety belt retractor located at said shoulder belt anchorage point to which retractor said shoulder belt is connected;

a non-adjustable lap belt anchorage means located at said lap belt anchorage point;

a belt locking assembly mounted on said safety belt and being adapted to slide upon a portion of said safety belt to adjust the length of said lap belt and said shoulder belt; and a buckle adapted to engage said belt locking assembly; said belt locking assembly comprising:

a housing for said belt locking assembly;

a buckle engaging means extending from said housing and adapted to be engaged in said buckle;

a roller adapted to allow a portion of said safety belt to move upon said roller;

a roller shaft mounted in said housing, said roller being arranged concentrically around a portion of said roller shaft and being adapted to rotate upon said roller shaft to facilitate movement of said assembly with reference to said safety belt;

a lock bar mounted in said housing and having an unlocked position and a locked position, said lock bar adapted to be moved from said unlocked position to said locked position when said assembly is engaged in said buckle, said lock bar in said unlocked position allowing said assembly to slide with reference to said safety belt both in the direction of said shoulder belt anchorage point and in the direction of said lap belt anchorage point, said lock bar in said locked position preventing said assembly from sliding with reference to said safety belt in the direction of said shoulder belt anchorage point, said lock bar having a buckle actuated portion adapted to be actuated by said buckle when said belt locking assembly is engaged by said buckle and a belt engaging portion adapted to clamp against a portion of said safety belt when said assembly is engaged by said buckle to prevent said roller from moving with reference to said safety belt in the direction of said shoulder belt anchorage point when said lock bar is in said locked position, and said buckle actuated portion being disposed at one end of said lock bar and said belt engaging portion being disposed at the opposite end of said lock bar, said lock bar having a pivot edge upon which said lock bar is adapted to pivot from said unlocked position to said locked position, said belt engaging portion of said lock bar having teeth disposed adjacent to said roller and adapted to clamp against a portion of said safety belt to prevent said roller from moving with reference to said safety belt in the direction of said shoulder belt anchorage point when said lock bar is in said locked position; and at least one leaf spring attached to said lock bar to bias said lock bar in said unlocked position.

* * * * *